(12) United States Patent
Altwaijry (10) Patent No.: US 9,052,497 B2
(45) Date of Patent: Jun. 9, 2015

(54) COMPUTING IMAGING DATA USING INTENSITY CORRELATION INTERFEROMETRY

(75) Inventor: Haithem Altwaijry, Riyadh (SA)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 535 days.

(21) Appl. No.: 13/418,333

(22) Filed: Mar. 12, 2012

(65) Prior Publication Data

US 2012/0232842 A1     Sep. 13, 2012

Related U.S. Application Data

(60) Provisional application No. 61/451,145, filed on Mar. 10, 2011.

(51) Int. Cl.
    *G02B 23/00*           (2006.01)

(52) U.S. Cl.
    CPC ...................................... *G02B 23/00* (2013.01)

(58) Field of Classification Search
    CPC ........................................................ G02B 23/00
    USPC .......................................................... 702/179
    See application file for complete search history.

(56) References Cited

U.S. PATENT DOCUMENTS

| | | | |
|---|---|---|---|
| 3,160,696 A | * | 12/1964 | Gamo ........................... 356/450 |
| 3,808,550 A | | 4/1974 | Ashkin |
| 4,623,930 A | | 11/1986 | Oshima et al. |
| 4,630,184 A | | 12/1986 | Ferrero |
| 4,710,817 A | | 12/1987 | Ando |
| 4,759,628 A | | 7/1988 | Tatsuno et al. |
| 4,979,221 A | | 12/1990 | Perryman et al. |
| 5,021,854 A | | 6/1991 | Huth |
| 5,157,473 A | | 10/1992 | Okazaki |
| 5,198,660 A | | 3/1993 | Yokoyama et al. |

(Continued)

FOREIGN PATENT DOCUMENTS

| CN | 202048982 U | 11/2011 |
|---|---|---|
| EP | 0451852 A1 | 10/1991 |

(Continued)

OTHER PUBLICATIONS

"Blind Super-Resolution from Multiple Undersampled Images using Sampling Diversity", 2010 by Faisal M. Al-Salem (p. 1) http://deepblue.lib.umich.edu/handle/2027.42/77804.

(Continued)

*Primary Examiner* — Bryan Bui
(74) *Attorney, Agent, or Firm* — Raj Abhyanker, P.C.

(57) ABSTRACT

A method includes receiving, at a computational station, photodetection data, originating at a source, encompassing a set of frequency channels and collected at a number of light gathering telescopes. The method also includes determining correlation between the received photodetection data in each frequency channel, and determining a time average of the correlation between the received photodetection data in the each frequency channel. Further, the method includes determining an average over the set of frequency channels to arrive at a mutual coherence magnitude for each pair of the number of light gathering telescopes, and computing imaging data of the source based on the determined mutual coherence magnitude and the correlation between the received photodetection data.

20 Claims, 10 Drawing Sheets

(56) References Cited

U.S. PATENT DOCUMENTS

| | | | |
|---|---|---|---|
| 5,212,382 A | 5/1993 | Sasaki et al. | |
| 5,262,871 A | 11/1993 | Wilder et al. | |
| 5,301,240 A | 4/1994 | Stockum et al. | |
| 5,308,976 A | 5/1994 | Misawa et al. | |
| 5,363,190 A | 11/1994 | Inaba et al. | |
| 5,412,422 A | 5/1995 | Yamada et al. | |
| 5,448,056 A | 9/1995 | Tsuruta | |
| 5,467,128 A | 11/1995 | Yates et al. | |
| 5,468,954 A | 11/1995 | Furukawa | |
| 5,557,542 A | 9/1996 | Asahina et al. | |
| 5,565,915 A | 10/1996 | Kindo et al. | |
| 5,631,704 A | 5/1997 | Dickinson et al. | |
| 5,650,643 A | 7/1997 | Konuma | |
| 5,665,959 A | 9/1997 | Fossum et al. | |
| 5,705,807 A | 1/1998 | Throngnumchai et al. | |
| 5,708,471 A | 1/1998 | Okumura | |
| 5,754,690 A | 5/1998 | Jackson et al. | |
| 5,777,669 A | 7/1998 | Uwatoko et al. | |
| 5,841,126 A | 11/1998 | Fossum et al. | |
| 5,892,541 A | 4/1999 | Merrill | |
| 5,923,369 A | 7/1999 | Merrill et al. | |
| 5,978,025 A | 11/1999 | Tomasini et al. | |
| 5,994,690 A * | 11/1999 | Kulkarni et al. | 250/216 |
| 6,028,300 A | 2/2000 | Rhoads et al. | |
| 6,078,037 A | 6/2000 | Booth, Jr. | |
| 6,115,065 A | 9/2000 | Yadid-Pecht et al. | |
| 6,118,482 A | 9/2000 | Clark et al. | |
| 6,130,423 A | 10/2000 | Brehmer et al. | |
| 6,130,713 A | 10/2000 | Merrill | |
| 6,157,016 A | 12/2000 | Clark et al. | |
| 6,181,375 B1 | 1/2001 | Mitsui et al. | |
| 6,236,449 B1 | 5/2001 | Tanitsu | |
| 6,248,990 B1 | 6/2001 | Pyyhtiä et al. | |
| 6,282,028 B1 | 8/2001 | Waibel et al. | |
| 6,297,488 B1 | 10/2001 | Beraldin et al. | |
| 6,330,030 B1 | 12/2001 | O'Connor | |
| 6,359,274 B1 | 3/2002 | Nixon et al. | |
| 6,366,312 B1 | 4/2002 | Crittenden | |
| 6,476,864 B1 | 11/2002 | Borg et al. | |
| 6,580,454 B1 | 6/2003 | Perner et al. | |
| 6,587,145 B1 | 7/2003 | Hou | |
| 6,603,607 B2 | 8/2003 | Matsui et al. | |
| 6,631,022 B1 | 10/2003 | Kihira et al. | |
| 6,633,028 B2 | 10/2003 | Fowler | |
| 6,633,335 B1 | 10/2003 | Kwon et al. | |
| 6,677,996 B1 | 1/2004 | Chung et al. | |
| 6,735,072 B2 | 5/2004 | Liao | |
| 6,825,936 B2 | 11/2004 | Metcalfe et al. | |
| 6,831,263 B2 | 12/2004 | Skurnik et al. | |
| 6,873,282 B1 | 3/2005 | Murphy | |
| 6,884,982 B2 | 4/2005 | Beusch | |
| 6,909,462 B1 | 6/2005 | Shinotsuka et al. | |
| 6,927,433 B2 | 8/2005 | Hynecek | |
| 6,927,796 B2 | 8/2005 | Liu et al. | |
| 6,972,795 B1 | 12/2005 | Etoh et al. | |
| 6,977,685 B1 | 12/2005 | Acosta-Serafini et al. | |
| 6,982,403 B2 | 1/2006 | Yang et al. | |
| 7,053,947 B2 | 5/2006 | Sohn | |
| 7,115,963 B2 | 10/2006 | Augusto et al. | |
| 7,126,838 B2 | 10/2006 | Koizumi et al. | |
| 7,205,522 B2 | 4/2007 | Krymski | |
| 7,233,350 B2 | 6/2007 | Tay | |
| 7,245,250 B1 | 7/2007 | Kalayeh | |
| 7,262,402 B2 | 8/2007 | Niclass et al. | |
| 7,277,129 B1 | 10/2007 | Lee | |
| 7,280,221 B2 | 10/2007 | Wei | |
| 7,286,174 B1 | 10/2007 | Weale et al. | |
| 7,319,423 B2 | 1/2008 | Augusto et al. | |
| 7,319,486 B2 | 1/2008 | Shinotsuka | |
| 7,324,146 B2 | 1/2008 | Kanai | |
| 7,391,004 B2 | 6/2008 | Takashima et al. | |
| 7,426,036 B2 | 9/2008 | Feldchtein et al. | |
| 7,466,429 B2 | 12/2008 | de Groot et al. | |
| 7,483,058 B1 | 1/2009 | Frank et al. | |
| 7,502,107 B2 | 3/2009 | Mohanty et al. | |
| 7,504,616 B2 | 3/2009 | Nakamura et al. | |
| 7,522,288 B2 | 4/2009 | de Groot | |
| 7,547,872 B2 | 6/2009 | Niclass et al. | |
| 7,593,651 B2 | 9/2009 | Nicholls et al. | |
| 7,598,998 B2 | 10/2009 | Cernasov et al. | |
| 7,619,674 B2 | 11/2009 | Han et al. | |
| 7,623,173 B2 | 11/2009 | Nitta et al. | |
| 7,626,624 B2 | 12/2009 | Fraenkel et al. | |
| 7,696,463 B2 | 4/2010 | Kamiyama | |
| 7,697,051 B2 | 4/2010 | Krymski | |
| 7,701,499 B2 | 4/2010 | Barnea et al. | |
| 7,718,953 B2 | 5/2010 | Prather et al. | |
| 7,728,893 B2 | 6/2010 | Kagawa et al. | |
| 7,795,650 B2 | 9/2010 | Eminoglu et al. | |
| 7,847,846 B1 | 12/2010 | Ignjatovic et al. | |
| 7,858,917 B2 | 12/2010 | Stern et al. | |
| 7,868,665 B2 | 1/2011 | Tumer et al. | |
| 7,889,355 B2 | 2/2011 | de Lega et al. | |
| 7,911,520 B2 | 3/2011 | Shigematsu et al. | |
| 7,940,317 B2 | 5/2011 | Baxter | |
| 7,956,912 B2 | 6/2011 | Berezin | |
| 7,999,945 B2 | 8/2011 | Zara | |
| 8,026,471 B2 | 9/2011 | Itzler | |
| 8,077,328 B2 | 12/2011 | Scheibengraber et al. | |
| 8,089,036 B2 | 1/2012 | Manabe | |
| 8,089,522 B2 | 1/2012 | Choi et al. | |
| 8,093,624 B1 | 1/2012 | Renzi et al. | |
| 8,107,290 B2 | 1/2012 | Lee et al. | |
| 8,120,687 B2 | 2/2012 | Nishino et al. | |
| 8,126,677 B2 | 2/2012 | de Groot et al. | |
| 8,338,773 B2 | 12/2012 | Eldesouki et al. | |
| 8,405,038 B2 | 3/2013 | Bouhnik et al. | |
| 8,408,034 B2 | 4/2013 | Ishihara et al. | |
| 8,410,416 B2 | 4/2013 | Eldesouki et al. | |
| 8,426,797 B2 | 4/2013 | Aull et al. | |
| 8,462,248 B2 | 6/2013 | Berezin | |
| 8,471,750 B2 | 6/2013 | Rogers et al. | |
| 8,471,895 B2 | 6/2013 | Banks | |
| 8,531,566 B2 | 9/2013 | Cieslinski | |
| 8,564,785 B2 * | 10/2013 | Newbury et al. | 356/451 |
| 8,570,421 B2 | 10/2013 | Okada et al. | |
| 8,587,697 B2 | 11/2013 | Hussey et al. | |
| 8,587,709 B2 | 11/2013 | Kawahito et al. | |
| 8,619,168 B2 | 12/2013 | Choi et al. | |
| 8,653,435 B2 | 2/2014 | Eldesouki | |
| 8,665,342 B2 | 3/2014 | Al-Salem et al. | |
| 8,785,831 B2 | 7/2014 | Krymski | |
| 8,829,409 B2 | 9/2014 | Wadsworth | |
| 8,838,213 B2 * | 9/2014 | Tearney et al. | 600/478 |
| 2001/0030277 A1 | 10/2001 | Rhoads | |
| 2001/0052941 A1 | 12/2001 | Matsunaga et al. | |
| 2002/0024058 A1 | 2/2002 | Marshall et al. | |
| 2003/0010896 A1 | 1/2003 | Kaifu et al. | |
| 2003/0103212 A1 | 6/2003 | Westphal et al. | |
| 2003/0193771 A1 | 10/2003 | Liao | |
| 2004/0058553 A1 | 3/2004 | Tanaka | |
| 2004/0189999 A1 | 9/2004 | De Groot et al. | |
| 2004/0243656 A1 | 12/2004 | Sung et al. | |
| 2005/0012033 A1 | 1/2005 | Stern et al. | |
| 2005/0248675 A1 | 11/2005 | Hashimoto et al. | |
| 2006/0044451 A1 | 3/2006 | Liang et al. | |
| 2006/0131480 A1 | 6/2006 | Charbon et al. | |
| 2006/0131484 A1 | 6/2006 | Peting | |
| 2006/0175529 A1 | 8/2006 | Harmon et al. | |
| 2006/0231742 A1 | 10/2006 | Forsyth | |
| 2006/0245071 A1 | 11/2006 | George et al. | |
| 2007/0022110 A1 | 1/2007 | Suda et al. | |
| 2007/0084986 A1 | 4/2007 | Yang et al. | |
| 2008/0106603 A1 | 5/2008 | Whitehead et al. | |
| 2008/0230723 A1 | 9/2008 | Tanaka et al. | |
| 2008/0231339 A1 | 9/2008 | Deschamps | |
| 2008/0252762 A1 | 10/2008 | Iwamoto et al. | |
| 2008/0279441 A1 | 11/2008 | Matsuo et al. | |
| 2009/0182528 A1 | 7/2009 | de Groot et al. | |
| 2009/0244971 A1 | 10/2009 | Lee et al. | |
| 2009/0256735 A1 | 10/2009 | Bogaerts | |
| 2010/0026838 A1 | 2/2010 | Belenky et al. | |
| 2010/0181491 A1 | 7/2010 | Karim et al. | |
| 2010/0182011 A1 | 7/2010 | Prescher et al. | |

(56) References Cited

U.S. PATENT DOCUMENTS

| | | |
|---|---|---|
| 2010/0204459 A1 | 8/2010 | Mason et al. |
| 2010/0213353 A1 | 8/2010 | Dierickx |
| 2010/0245809 A1 | 9/2010 | Andreou et al. |
| 2010/0270462 A1 | 10/2010 | Nelson et al. |
| 2010/0271517 A1 | 10/2010 | De Wit et al. |
| 2010/0315709 A1 | 12/2010 | Baer |
| 2011/0017918 A1 | 1/2011 | Baeumer et al. |
| 2011/0090385 A1 | 4/2011 | Aoyama et al. |
| 2011/0188120 A1 | 8/2011 | Tabirian et al. |
| 2011/0249148 A1 | 10/2011 | Prescher et al. |
| 2011/0260039 A1 | 10/2011 | Fowler |
| 2012/0056078 A1 | 3/2012 | Eldesouki et al. |
| 2012/0057059 A1 | 3/2012 | Eldesouki et al. |
| 2012/0057152 A1 | 3/2012 | Eldesouki et al. |
| 2012/0091324 A1 | 4/2012 | Grund |
| 2012/0113252 A1 | 5/2012 | Yang et al. |
| 2012/0138774 A1 | 6/2012 | Kelly et al. |
| 2012/0229669 A1 | 9/2012 | Okada et al. |
| 2013/0057945 A1 | 3/2013 | Ueno et al. |
| 2013/0068928 A1 | 3/2013 | Eldesouki et al. |
| 2013/0094030 A1 | 4/2013 | Sherif et al. |
| 2013/0135486 A1 | 5/2013 | Wan |
| 2013/0168535 A1 | 7/2013 | Eldesouki |
| 2014/0097329 A1 | 4/2014 | Wadsworth |

FOREIGN PATENT DOCUMENTS

| | | |
|---|---|---|
| EP | 1041637 A1 | 10/2000 |
| EP | 1104178 A1 | 5/2001 |
| EP | 1148348 A2 | 10/2001 |
| WO | 9918717 A1 | 4/1999 |
| WO | 2005069040 A1 | 7/2005 |
| WO | 2007043036 A1 | 4/2007 |
| WO | 2008151155 A2 | 12/2008 |
| WO | 2009042901 A1 | 4/2009 |
| WO | 2009115956 A2 | 9/2009 |
| WO | 2010124289 A1 | 10/2010 |
| WO | 2013105830 A1 | 7/2013 |

OTHER PUBLICATIONS

Design and characterization of ionizing radiation-tolerant CMOS APS image sensors up to 30 Mrd (Si) total dose, Nuclear Science, IEEE Xplore Digital Library, vol. 48 Issue:6, Dec. 2001 by El-Sayed Eid et al. (p. 1) http://ieeexplore.ieee.org/xpl.articleDetails.jsp?tp=&arnumber=983133&url=http%3A%2F%2Fieeexplore.ieee.org%2Fxpls%2Fabs_all.jsp%3Farnumber%3D983133.

"Spatial speckle correlometry in applications to tissue structure monitoring", ResearchGate, Applied Optics, vol. 36, Issue 22, 1997 by D. A. Zimnyakov et al. (p. 1) http://www.researchgate.net/publication/5593616_Spatial_speckle_correlometry_in_applications_to_tissue_structure_monitoring.

"Integrated CMOS Sensors for Fluorescence Spectroscopy and Imaging", ResearchGate, Nov. 2009 by Munir El-Desouki et al. (p. 1) http://www.researchgate.net/publication/249653851_Integrated_CMOS_Sensors_for_Fluorescence_Spectroscopy_and_Imaging.

"Applications of ring laser fields for microstructure creation", Nonlinear Pnenomena In Complex Systems, vol. 14, No. 3, Nov. 2011 by Anatol Ryzhevich et al. (p. 1) http://www.j-npcs.org/abstracts/vol2011/v14no3/v14no3p236.html.

"A CMOS Active Pixel Image Sensor with In-pixel CDS for High-Speed Cameras", Jan. 17, 2004 by Toru Inoue et al. (pp. 8) http://www.photron.com/whitepapers/A%20CMOS%20Active%20Pixel%20Image%20Sensor%20with%20In-pixel%20CDS%20for%20High-Speed%20Cameras.pdf.

"Miniature endoscope for simultaneous optical coherence tomography and laser-induced fluorescence measurement", Applied Optics, vol. 43, No. 1, Jan. 1, 2004 by Alexandre R. Tumlinson et al. (pp. 9) http://www2.engr.arizona.edu/~bmeoptics/papers/Miniatureendoscope.pdf.

"CMOS Active-Pixel Sensor With In-Situ Memory for Ultrahigh-Speed Imaging", ResearchGate, Jul. 2011 by M.M. El-Desouki et al. (p. 1) http://www.researchgate.net/publication/224184430_CMOS_Active-Pixel_Sensor_With_In-Situ_Memory_for_Ultrahigh-Speed_Imaging.

"A 4M Pixel CMOS Image Sensor for High Speed Image Capture", P. Donegan et al. (pp. 4).

"A CMOS image sensor for high-speed imaging", IEEE Xplore—Digital Library, 2000 by Stevanovic, N. et al. (p. 1) http://ieeexplore.ieee.org/xpl/articleDetails.jsp?tp=&arnumber=839710&url=http%3A%2F%2Fieeexplore.ieee.org%2Fxpls%2Fabs_all.jsp%3Farnumber%3D839710.

"Ultra-High-Speed Image Signal Accumulation Sensor," sensors, 2010 by Takeharu Goji Etoh et al. (p. 12).

"Fast Model-Free Super-Resolution Using a Two-Sensor Camera", Techtransfer, University of Michigan by Andrew Yagle (p. 1) http://inventions.umich.edu/technologies/4806_fast-model-free-super-resolution-using-a-two-sensor-camera.

* cited by examiner

COMPUTING IMAGING DATA USING INTENSITY CORRELATION INTERFEROMETRY

CLAIM OF PRIORITY

This is a non-provisional application and claims priority to US Provisional application no. 61/451,145 titled "OPTICAL IMAGING USING INTENSITY CORRELATION INTERFEROMETRY" filed on Mar. 10, 2011.

FIELD OF TECHNOLOGY

This disclosure relates generally to optical imaging and more particularly, to a method, an apparatus and/or a system of computing imaging data using intensity correlation interferometry.

BACKGROUND

Interferometry may be a process of combining waves in such a way that they constructively interfere. In other words, when each of two or more independent sources detects a signal at the same given frequency, the aforementioned signals may be combined to achieve an enhanced version thereof.

Amplitude interferometry may be a method to obtain optical images of extraterrestrial bodies using light collectors that are in a given alignment. Michelson interferometers may need to be used in combination with the light collectors to negate the effects of a light source that is closer to the bodies than the light collectors. Further, amplitude interferometry may require the beams collected at the individual light collectors to be transferred among the light collectors so that the beams can be combined and/or the phase thereof preserved.

Also, amplitude interferometry may require the light collectors in the form of telescopes to be in a specified alignment (e.g., a light collector at a specified distance from another light collector) and the light collectors to be connected to each other. Furthermore, multi level pod combiners placed at specific distances and/or moving at a precise distance from the light collectors may be required, and measurement of a small angle may require a large distance between the light collectors.

SUMMARY

Disclosed are a method, a system and/or an apparatus of computing imaging data using intensity correlation interferometry.

In one aspect, a method includes receiving, at a computational station, photodetection data, originating at a source, encompassing a set of frequency channels and collected at a number of light gathering telescopes and determining, through the computational station, correlation between the received photodetection data in each frequency channel. The method also includes determining, through the computational station, a time average of the correlation between the received photodetection data in the each frequency channel, and determining, through the computational station, an average over the set of frequency channels to arrive at a mutual coherence magnitude for each pair of the number of light gathering telescopes. Further, the method includes computing imaging data of the source based on the determined mutual coherence magnitude and the correlation between the received photodetection data.

In another aspect, an interferometer includes a number of detectors configured to detect photodetection data originating at a source and encompassing a set of frequency channels, and a correlator to receive the detected photodetection data and to determine correlation between the received photodetection data in each frequency channel. The interferometer also includes a recorder to record the determined correlation, and a computational station to determine an average over the set of frequency channels to arrive at a mutual coherence magnitude for each pair of the number of detectors and to compute imaging data of the source based on the determined mutual coherence magnitude and the correlation between the received photodetection data.

In yet another aspect, a planet imaging system includes a number of spacecrafts, each of which includes a light gathering telescope to collect photodetection data encompassing a set of frequency channels from a source, and a number of canceling collectors placed appropriately to negate an effect of any light emitting body closer to the source than the plurality of spacecrafts. The planet imaging system also includes a first pod combiner to collect the photodetection data from the number of spacecrafts, a second pod combiner to collect the photodetection data from the number of canceling collectors, and an imaging combiner to collect data from both the first pod combiner and the second pod combiner.

Further, the planet imaging system includes a computational station to receive data from the imaging combiner, to compute the correlation between the photodetection data in each frequency channel, to determine a time average of the correlation between the photodetection data in the each frequency channel, to determine an average over the set of frequency channels to arrive at a mutual coherence magnitude for each pair of the number of spacecrafts, and to compute imaging data of the source based on the determined mutual coherence magnitude and the correlation between the received photodetection data.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this disclosure are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a method, an apparatus, and/or a system of computing imaging data using intensity correlation interferometry. Although the present embodiments have been described with respect to specific example embodiments, it will be evident that various modifications and changes may be made to these embodiments without departing from the broader spirit and scope of the various embodiments.

In one or more embodiments, an interferometer may be defined as an optical, acoustic and/or frequency instrument that uses interference phenomena between a reference wave and an experimental wave and/or two parts of the experimental wave to determine wavelengths and wave velocities. In one or more embodiments, the interferometer may be used to measure distances, thicknesses and/or calculate indices of refraction. Interferometry takes advantage of the fact that light behaves like waves. In one or more embodiments, two or more waves may interact constructively to result in an enhanced version thereof. In another embodiment, the waves may destructively interfere.

Figure 1:
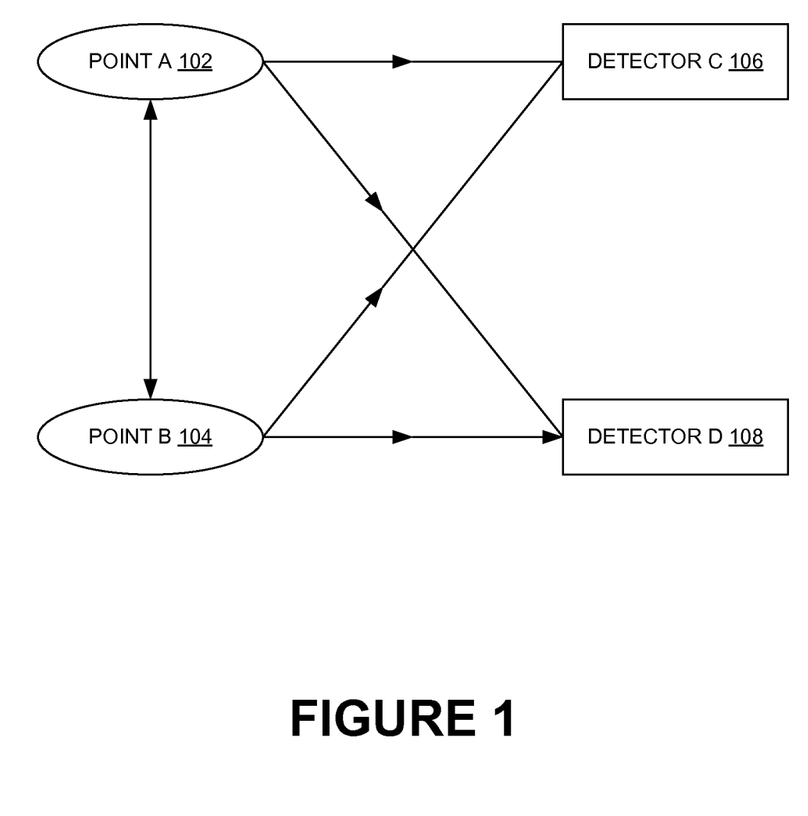
FIG. 1 is a schematic view of detection of photons by detectors, according to one or more embodiments.

FIG. 1 shows detection of photons by detectors, according to one or more embodiments. In one or more embodiments, a photon may be detected at each of detector C 106 and detector D 108 and averaged over all initial phases thereof. In one or more embodiments, the detected photon(s) at each of the two detectors C 106 and D 108 may have four possibilities associated therewith. In or more embodiments, both photons may originate at either point A 102 or point B 104. Therefore, the possibility of interference may be nil. In another embodiment, similar photons may originate from point A 102 and point B 104, thereby giving rise to interference.

For example, consider point A 102 and point B 104 in a source that may emit photons to be detected by detector A 106 and detector D 108, as shown in FIG. 1. In an example embodiment, a joint detection takes place when the photon emitted by point A 102 is detected by detector C 106 and the photon emitted by point B 104 is detected by detector D 108. In another example embodiment, point A 102 may emit a photon that is detected by detector D 108 and point B 104 may emit a photon that is detected by detector C 106. The quantum mechanical probability amplitudes for these two possibilities may be denoted by <detector C/point A><detector D/point B> and <detector D/point A><detector C/point B>respectively.

Figure 2:
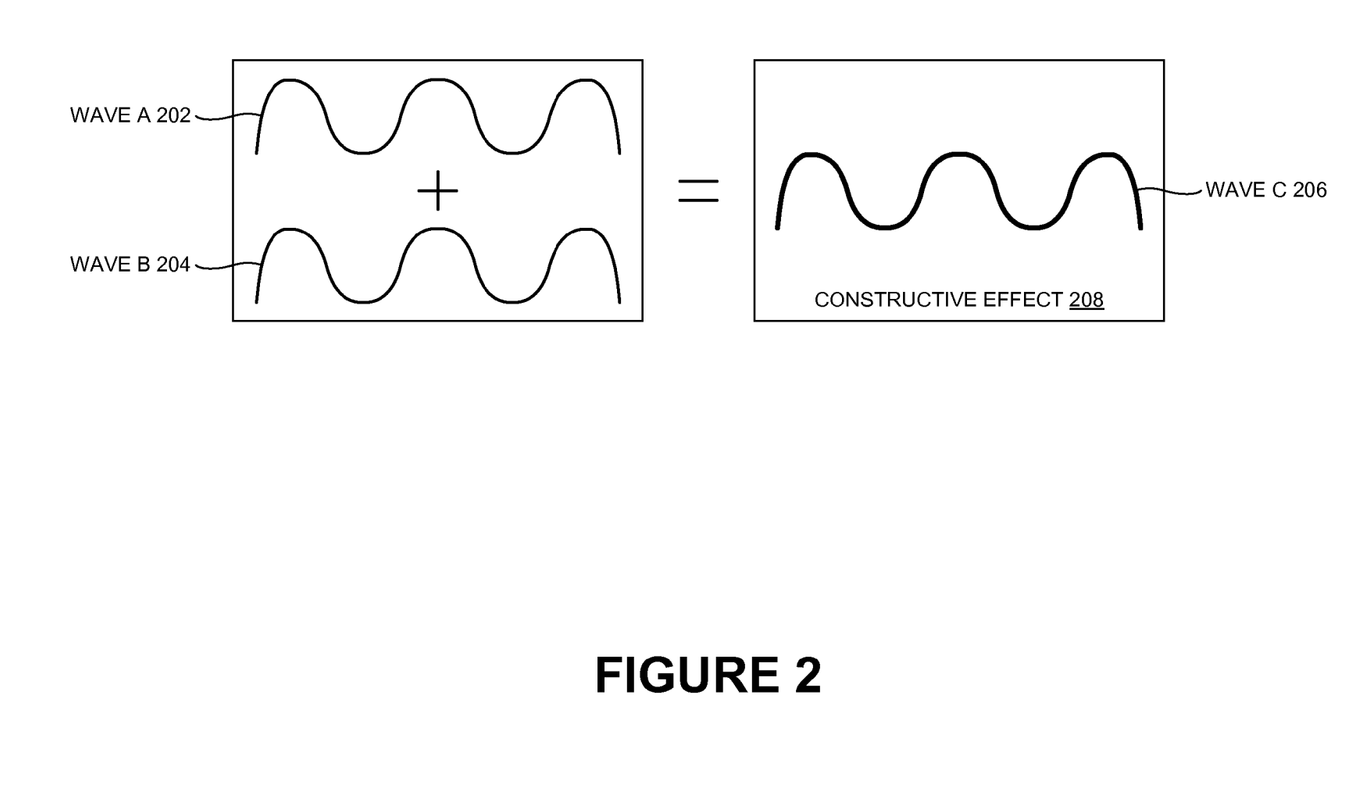
FIG. 2 is a schematic view of a constructive effect of combining two waves of similar intensities, according to one or more embodiments.

FIG. 2 shows the constructive effect (e.g., constructive effect 208) of combining two waves of similar intensities, according to one or more embodiments. In the example embodiment of FIG. 2, wave A 202 and wave B 204 may be combined constructively to obtain a constructive effect 208 in the form of wave C 206.

Figure 3:
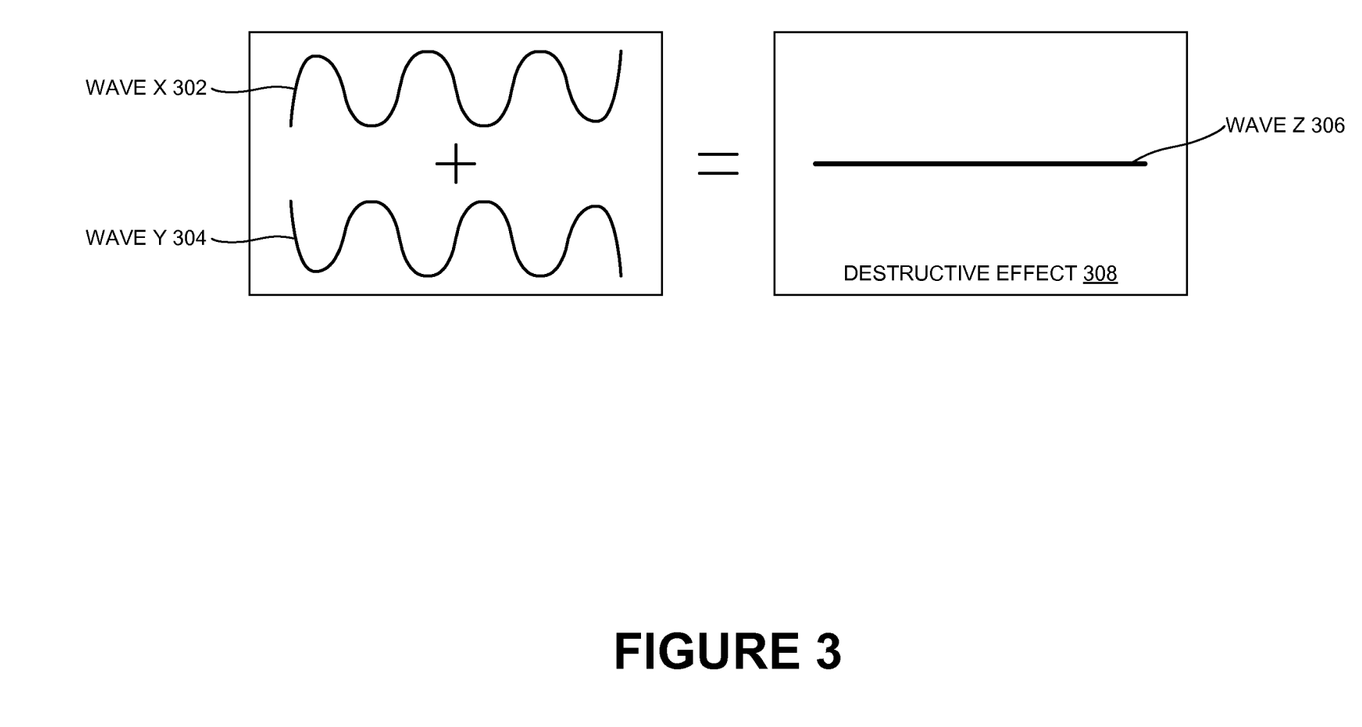
FIG. 3 is a schematic view of a destructive effect of combining two waves of different intensities, according to one or more embodiments.

FIG. 3 shows the destructive effect (e.g., destructive effect 308) of combining two waves of different (e.g., equal amplitude but opposite phase) intensities, according to one or more embodiments. In the example embodiment of FIG. 3, wave X 302 and wave Y 304 (having equal amplitudes but opposite phases) combine destructively to cancel each other. Thus, the destructive effect 308 produces wave Z 306 of zero amplitude.

Figure 4:
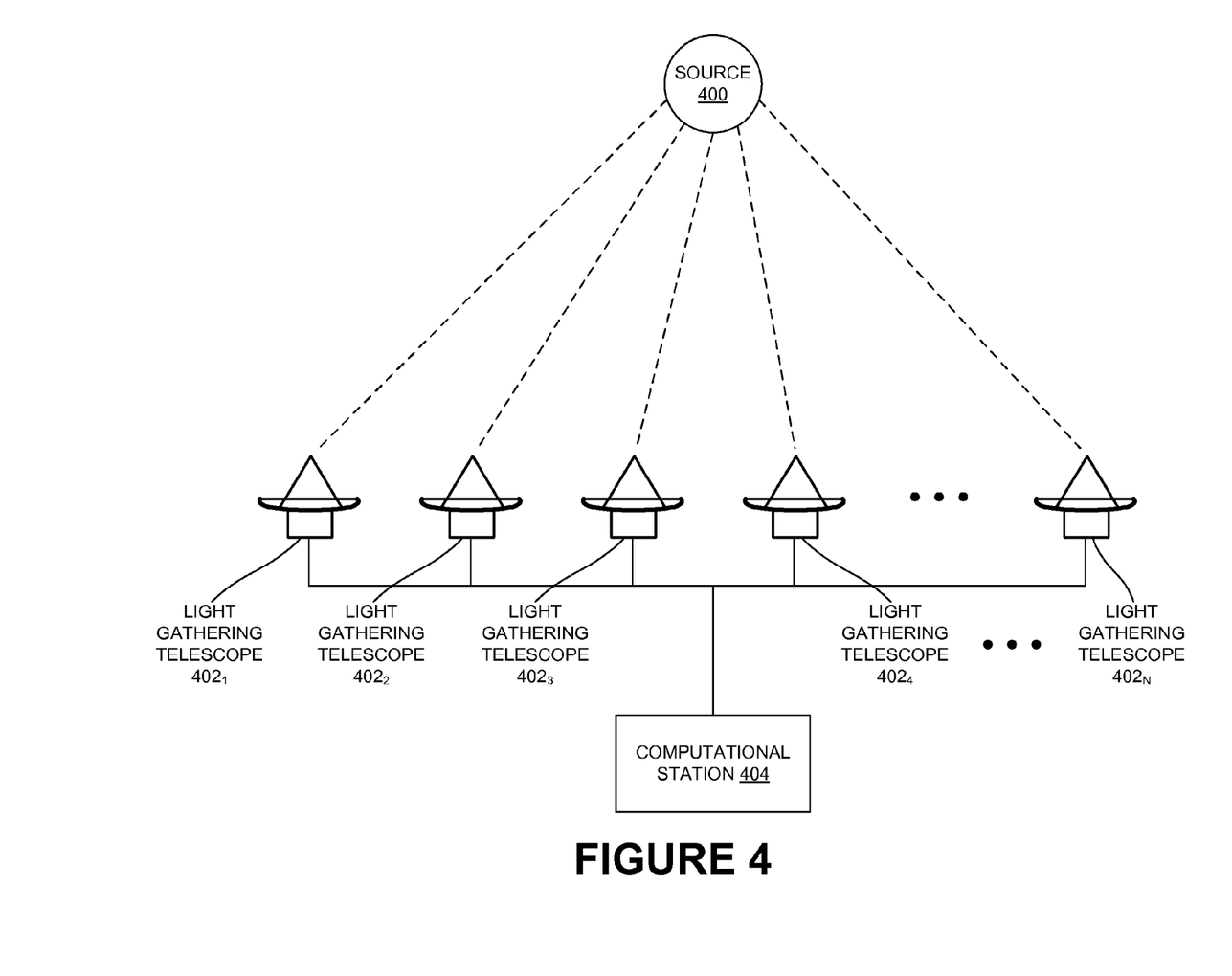
FIG. 4 is a schematic view of photodetection at multiple locations and a subsequent transfer of photodetection data collected to a computational station, according to one or more embodiments.

FIG. 4 shows photo detection at multiple locations, according to one or more embodiments. In one or more embodiments, at each of the light gathering telescopes $402_{1-N}$ of FIG. 4, photodetection data, originating from source 400 and ranging across a set of frequency channels, may be collected. Examples of source 400 include but are not limited to a planet, a star, and any other extraterrestrial body. The extraterrestrial body may be a natural object existing outside the earth and outside the earth's atmosphere. In one or more embodiments, the photodetection data collected may be communicated to a computational station 404 and collected thereat.

In one or more embodiments, computational station 404 may be configured to calculate the correlation between photodetection data in each of the frequency channels/bands. In one or more embodiments, computational station 404 may also be configured to calculate a time average of the correlation between the photodetection data in each frequency band. In one or more embodiments, computational station 404 may further be configured to determine the average over frequency channels to arrive at measurements of mutual coherence magnitude for each pair of telescopes (e.g., light gathering telescopes $402_{1-N}$). Further, in one or more embodiments, computational station 404 may be configured to compute imaging data through phase retrieval techniques.

In one or more embodiments, entry pupil processing may be used to obtain ultra-fine resolution imaging. One skilled in the art would be aware of entry pupil processing and, therefore, discussion associated therewith has been skipped for the sake of convenience and brevity. In the example embodiment of FIG. 4, computational station 404 may be configured to compute mutual coherence information between pairs of light gathering telescopes $402_{1-N}$. Further, the computational station 404 may be configured to compute the desired image of the source 400. In contrast to conventional techniques such as Michelson interferometry, the system described in FIG. 4 may eliminate the need for extreme-precision relative positioning control for the path length control of the light gathering telescopes $402_{1-N}$ and the need for transporting collected beams at the light gathering telescopes $402_{1-N}$ to a central combiner. Light collecting telescopes $402_{1-N}$ may be independent and even the propagation of light to the central combiner may not be required.

In one or more embodiments, within a modern quantum optics framework, signal-to-noise characteristics of the coherence may be obtained through a system similar to the one shown in FIG. 4. In an example embodiment, partial coherence may be used to attenuate a parent star of an extrasolar planet (exoplanet). The advantages of an improved signal-to-noise ratio may be used as a basis for a multispectral intensity correlation imaging system design.

In an example embodiment, a multi-spacecraft distributed formation may consist of several free-flying spacecraft, with each spacecraft carrying a light gathering telescope (e.g., light gathering telescope $402_{1-N}$). The light gathering telescope being carried by the spacecraft may be smaller in comparison to a telescope that is based on the ground and a baseline associated therewith. In the example embodiment, the spacecraft may execute maneuvers. The light gathering telescopes on the spacecraft may collect beams from a light source. The beams collected from selected pairs of telescopes may interfere to produce a continuous sequence of measurements to form interferometric images. The aforementioned may enable design of a free flying space-borne interferometer that is used to obtain improved image quality for de-convolved images produced by interferometry.

In one or more embodiments, formulation of the image acquisition process relevant to the multi-spacecraft formation may lead to the development of an image quality metric based on evolving modulation transfer function (MTF) of the system and a signal-to-noise ratio. In one or more embodiments, the MTF function may be a transfer of modulation from the source 400 to the image that is computed at the computational station 400. In one or more embodiments, the signal-to-noise ratio may be a ratio of the power of a signal from the source 400 to the noise associated therewith. Additionally, an optimal imaging problem may be based on analysis of the system's resolution in the spatial frequency domain.

In one or more embodiments, quantum superposition may be an event that can be realized in two or more indistinguishable ways, with the system state of the system being a superposition of each way simultaneously. In one or more embodiments, the photodetection data from the light gathering telescopes $402_{1-N}$ may be subject to quantum superposition when considered in pairs and other combinations.

Figure 5:
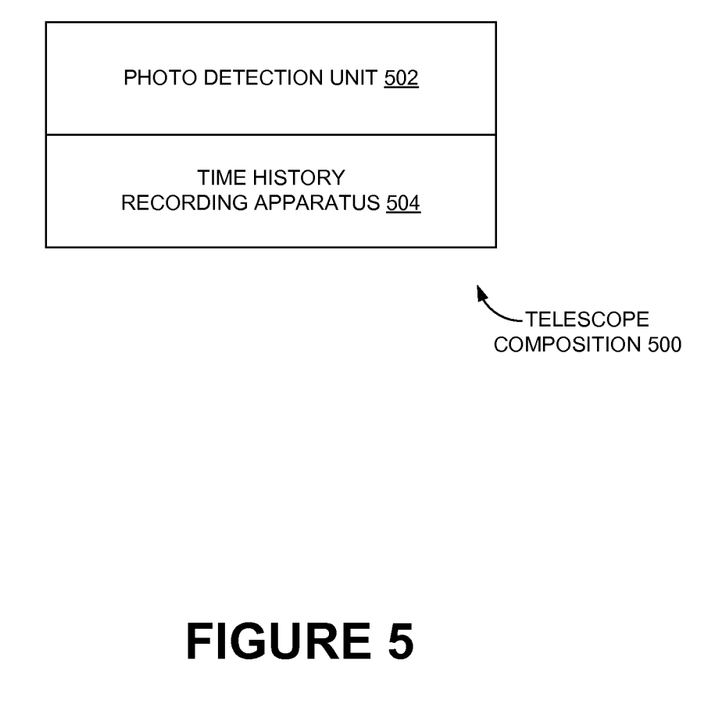
FIG. 5 is a schematic view of a telescope composition, according to one or more embodiments.

FIG. 5 illustrates a telescope composition 500. In one or more embodiments, each of the light gathering telescopes $402_{1-N}$ may include a photo detection unit 502 and a time history recording apparatus 504. In one or more embodiments, photo detection unit 502 may detect photons from the source 400. In one or more embodiments, the time history recording apparatus 504 may record time of receiving the photons from the source 400. In one or more embodiments, recording of the time of receiving the photons from the source 400 may be relevant to the computation that needs to be made at the computational station 404.

In one or more embodiments, the light collected by the light gathering telescopes $402_{1-N}$ may be transferred to photodetection apparatus (not shown) and further transferred to associated electronics to aid in the computation made at the computational station 404.

Figure 6:
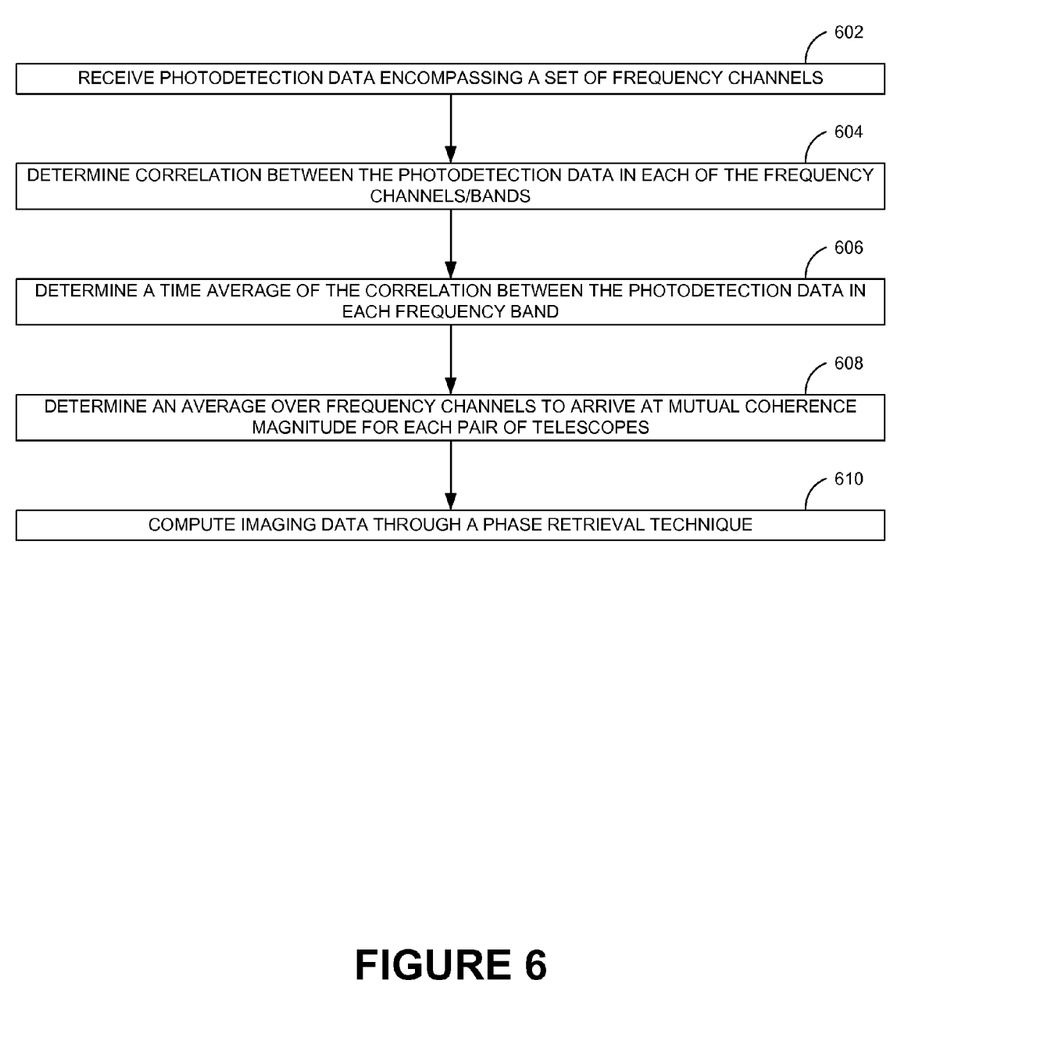
FIG. 6 is process flow detailing the operations involved in computing imaging data at a computational station, according to one or more embodiments.

FIG. 6 shows a process flow diagram detailing the operations involved in computing imaging data at the computational station 404 of FIG. 4, according to one or more embodiments. In one or more embodiments, operation 602 may involve receiving photodetection data encompassing a set of frequency channels at computational station 404. In one or more embodiments, operation 604 may involve determining correlation between the photodetection data in each of the frequency channels/bands. In one or more embodiments, operation 606 may involve determining a time average of the correlation between the photodetection data in each frequency band. In one or more embodiments, operation 608 may involve determining an average over the frequency channels to arrive at measurements of mutual coherence magnitude for each pair of telescopes (e.g., light gathering telescopes $402_{1-N}$). In one or more embodiments, operation 610 may then involve computing an imaging data through phase retrieval techniques.

In one or more embodiments, the image thus obtained may be better than the results obtained using amplitude interferometry. In one or more embodiments, utilization of the system disclosed in FIGS. 4-6 may not require precision (e.g., nanometer level) control of the relative positions of devices in the system and may be less expensive in comparison to a system that uses amplitude interferometry. Further, the system of FIG. 4 may be superior to a system utilizing amplitude interferometry when the number of apertures may increase to, for example, 10 apertures. In one or more embodiments, the superiority may be due to the absence of beam splitting and throughput losses that may be present in a system utilizing amplitude interferometry.

Figure 7:
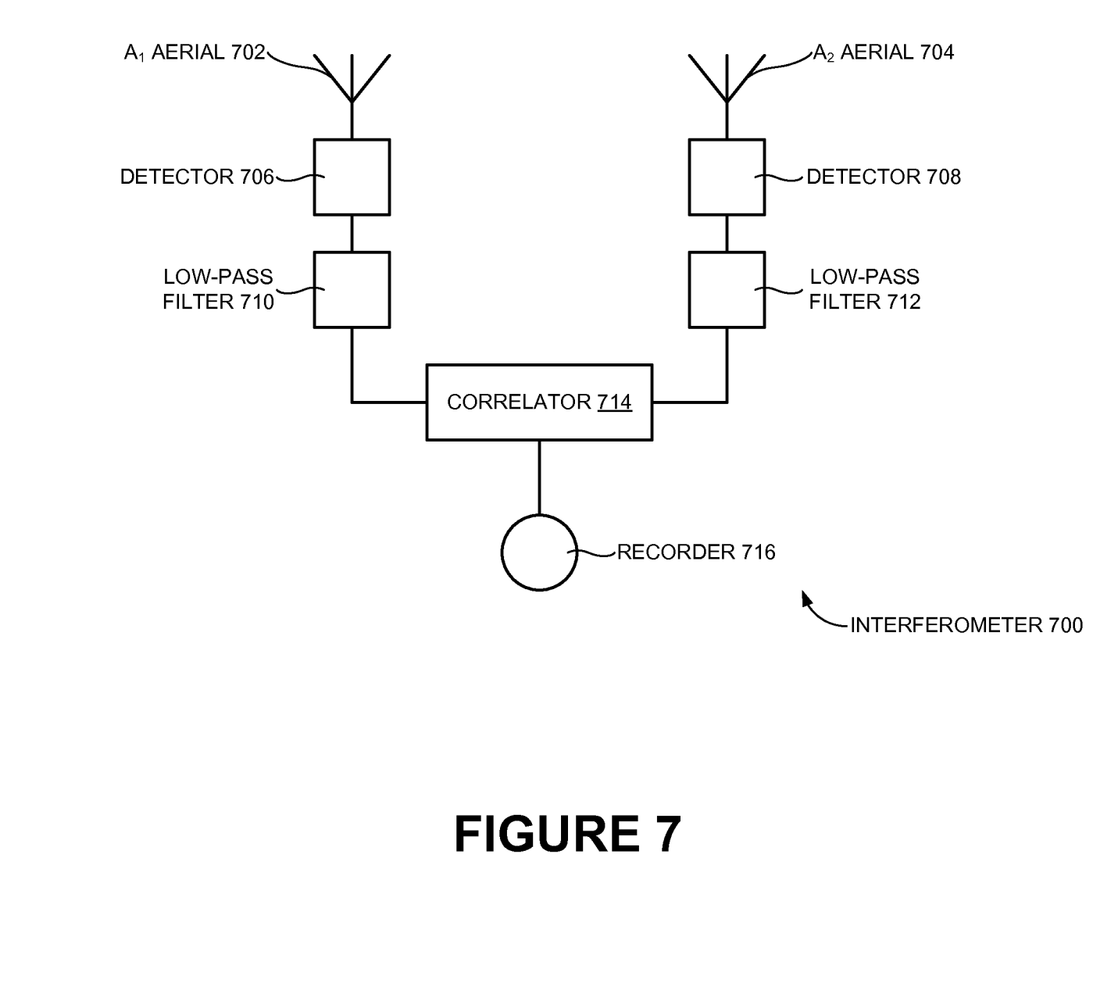
FIG. 7 is a schematic view of an interferometer, according to one or more embodiments.

FIG. 7 shows an interferometer 700, according to one or more embodiments. In one or more embodiments, the interferometer 700 may be used to measure the angular diameter of extraterrestrial bodies. In one or more embodiments, interferometer 700 may include two aerials (or, antennas) $A_1$ 702 and $A_2$ 704 associated with detector 706 and detector 708 respectively. In one or more embodiments, signals from the two aerials A1 702 and A2 704 may be detected (e.g., through detector 706 and detector 708) independently and the correlation between low frequency outputs of the detector(s) recorded. In one or more embodiments, correlation between the intensity fluctuations of the two signals may be measured. In one or more embodiments, the two signals from the aerials may not be required to be combined before detection. In one or more embodiments, relative phase between the two signals may not be required to be preserved.

In one or more embodiments, baseline may be a projected separation between any two light gathering telescopes (e.g., any two of light gathering telescopes $402_{1-N}$) as seen from the source 400. In one or more embodiments, the system of FIGS. 4, 5 and/or 7 may be designed to work with large baselines. In one or more embodiments, the signals detected by the detectors 706 and 708 may be passed through low pass filters (e.g., low-pass filter 710 and low-pass filter 712 respectively). In one or more embodiments, low frequency signals from the low pass filters may be transferred to a correlator 714 to determine the correlation. Further, the correlation determined between the two signals may be recorded in a recorder 716.

Figure 8:
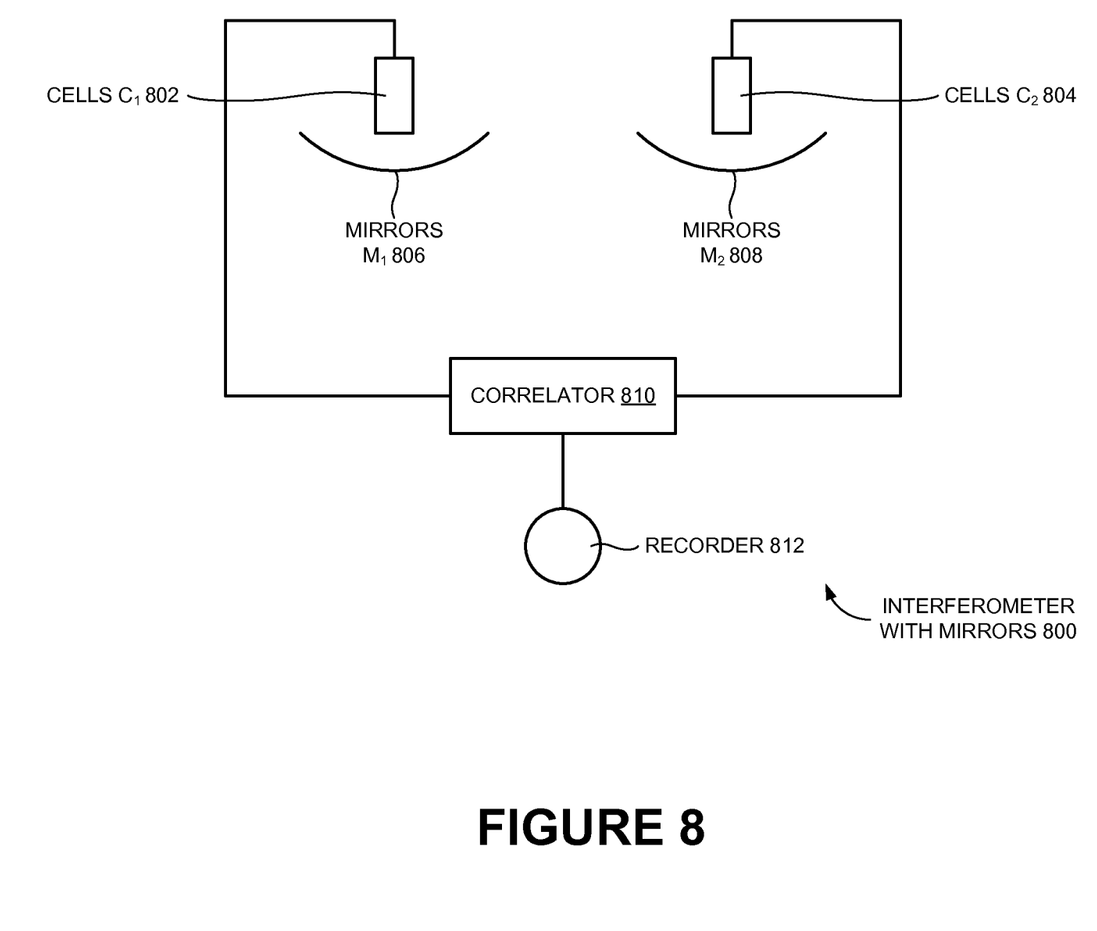
FIG. 8 is a schematic view of an interferometer with mirrors, according to one or more embodiments.

FIG. 8 shows an interferometer with mirrors 800, according to one or more embodiments. In one or more embodiments, light beams may be incident on mirrors M1 806 and M2 808 (instead on the aerials as seen in interferometer 700 of FIG. 7). In one or more embodiments, detectors (e.g., 706 and 708) may be replaced by cells $C_1$ 802 and $C_2$ 804. In one or more embodiments, cells $C_1$ 802 and $C_2$ 804 may be photoelectric cells, light detectors and/or phototubes whose electrical output varies with a variation in the incident light beams. In one or more embodiments, the light beams incident on the mirrors $M_1$ 806 and $M_2$ 808 may be reflected onto cells $C_1$ 802 and $C_2$ 804 to measure the correlation between the fluctuations in the current as a function of a distance between the two mirrors $M_1$ 806 and $M_2$ 808. In one or more embodiments, the correlation may be computed in a correlator 810. In one or more embodiments, the correlation calculated by the correlator 810 may be recorded in a recorder 812.

Figure 9:
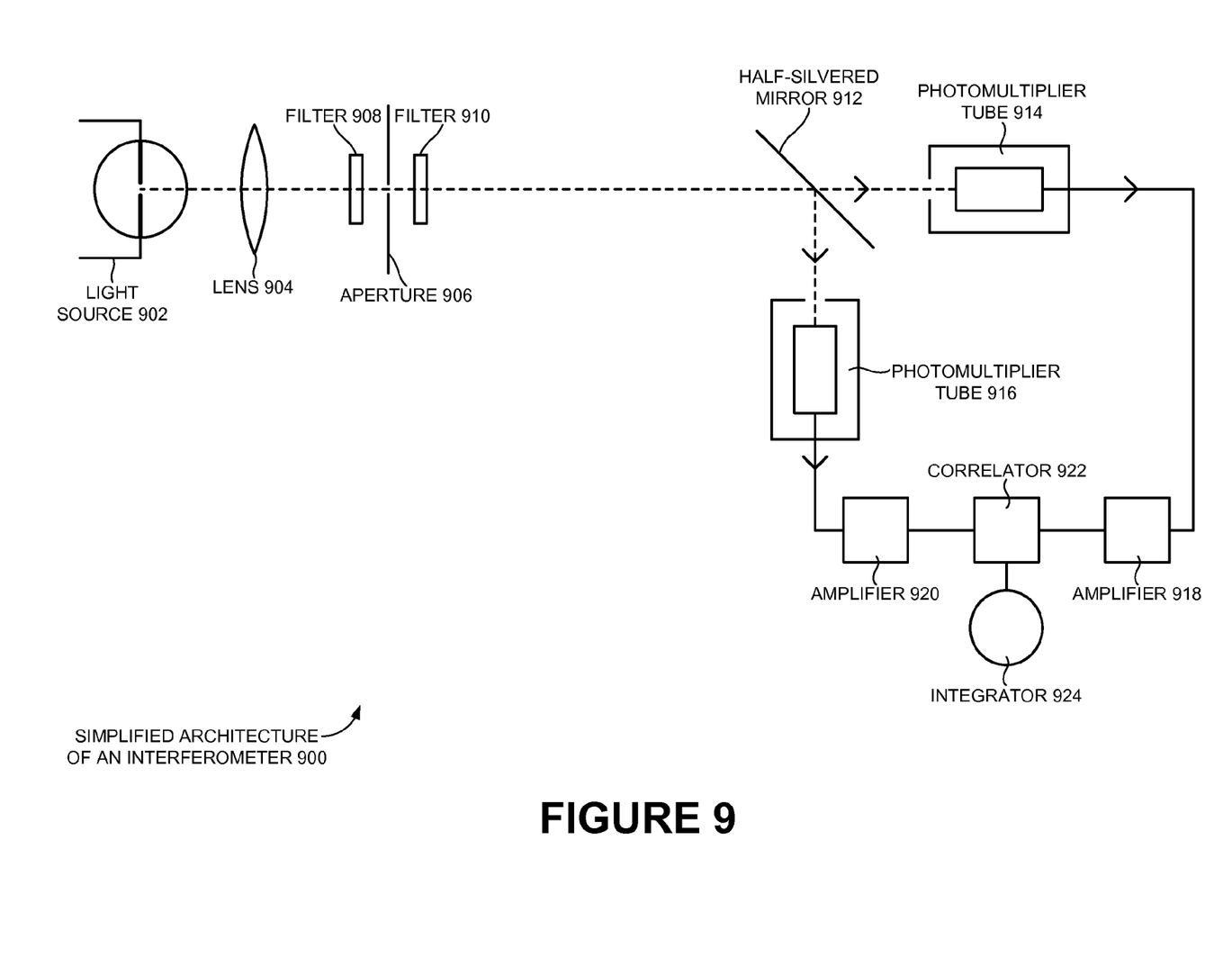
FIG. 9 is a schematic view of a simplified architecture of an interferometer, according to one or more embodiments.

FIG. 9 shows a simplified architecture of an interferometer 900, according to one or more embodiments. In one or more embodiments, a light source 902 may be formed by a mercury arc. In one or more embodiments, beams from the light source 902 may be passed through the lens 904. In one or more embodiments, a low frequency beam may be isolated through a system of filters that include, for example, a combination of filter 908, aperture 906 and filter 910. In one or more embodiments, the low frequency beam may be divided into two parts by a half silvered mirror 912 to illuminate cathodes of photomultiplier tubes 914 and 916. In one or more embodiments, apertures of the photomultiplier tubes (914, 916) may be identical.

In one or more embodiments, the cathodes of the photomultiplier tubes 914 and 916 may not be located at equal distances from the light source 902. In one or more embodiments, fluctuations of output currents from the photomultiplier tubes 914 and 916 may be amplified through amplifiers 918 and 920 and multiplied together in a correlator 922. In one or more embodiments, average value of the product may be recorded in an integrator 924. In one or more embodiments, the average value that is recorded by the integrator 924 may be a measure of the correlation in the fluctuations.

Figure 10:
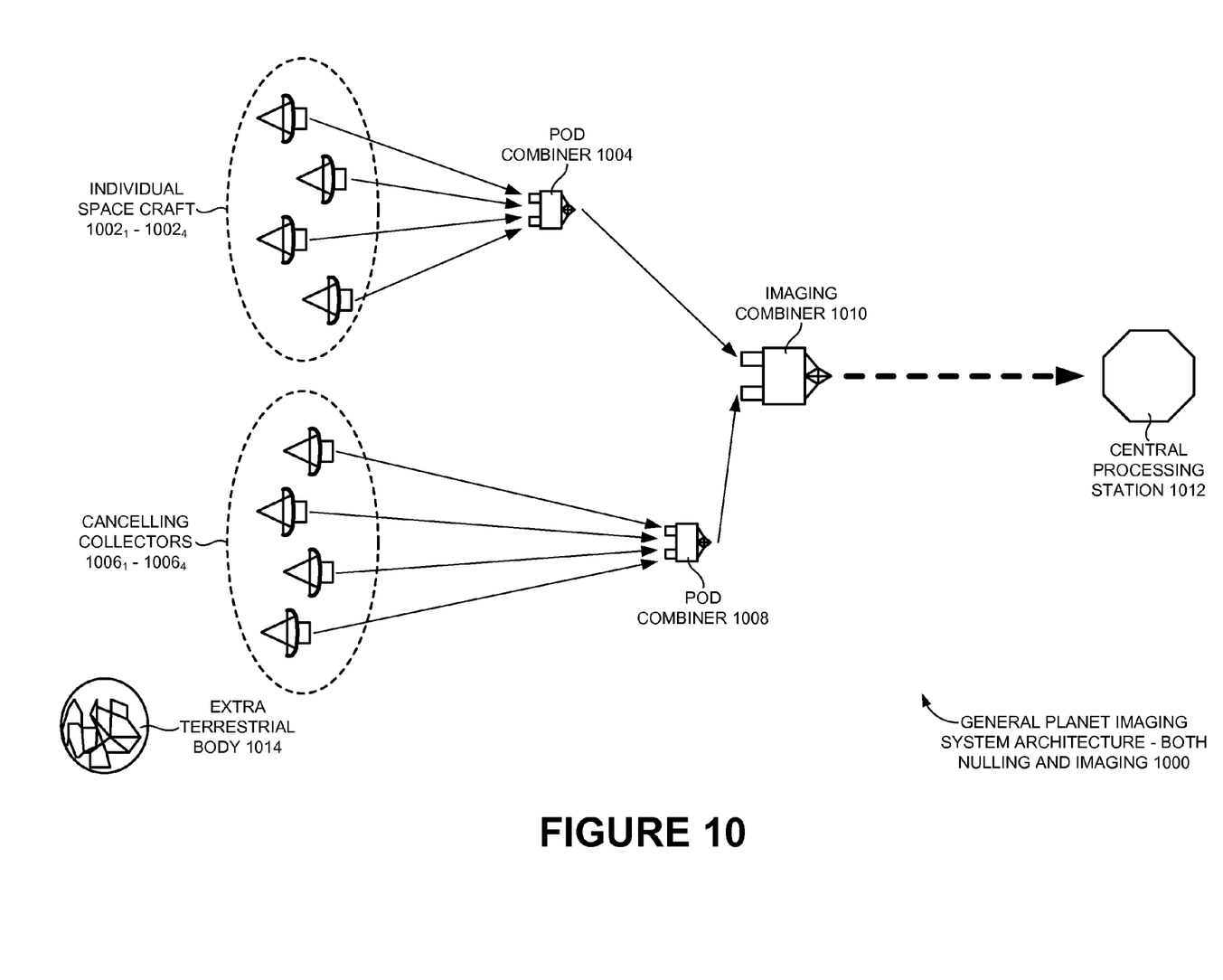
FIG. 10 is a schematic view of a planet imaging system architecture, according to one or more embodiments.

FIG. 10 shows schematic view of a general planet imaging architecture 1000, according to one embodiment. In one or more embodiments, individual spacecrafts $1002_{1-4}$ may be light collectors and/or beam collectors. In other words, the individual spacecraft $1002_{1-4}$ may carry light gathering telescopes to collect light and/or beams from an extraterrestrial body 1014. In one or more embodiments, the individual spacecrafts $1002_{1-4}$ may not move in a single plane. In one or more embodiments, the individual spacecrafts $1002_{1-4}$ may be independent of each other.

In one or more embodiments, cancelling collectors $1006_{1-4}$ may be placed appropriately to negate the effect of any light emitting bodies that may be closer to the extraterrestrial body 1014 in comparison to the individual spacecraft $1002_{1-4}$. In one or more embodiments, the individual spacecraft $1002_{1-4}$ and the cancelling collectors $1006_{1-4}$ may not be in any alignment and/or formation. In one or more embodiments, photodetection data from the individual spacecraft $1002_{1-4}$ and cancelling collectors $1006_{1-4}$ may be collected at a pod combiner 1004 and pod combiner 1008.

In one or more embodiments, an imaging combiner 1010 may collect data from the pod combiners 1004 and 1008. In one or more embodiments, the imaging combiner 1010 may determine pairs of telescopes on individual spacecrafts $1002_{1-4}$ and the imaging data that is collected at the imaging combiner 1010 is transferred to a central processing station 1012. In one or embodiments, the system disclosed in FIG. 10 may include a phasing beacon (not shown). In one or more embodiments, use of devices such as a phasing beacon may negate the need to propagate beams collected at individual spacecrafts $1002_{1-4}$ and cancelling collectors $1006_{1-4}$ to combining stations that need to move at a specified distance and alignment from the individual spacecrafts $1002_{1-4}$ that carry the telescopes.

In an example embodiment, the system of FIG. 4 may be used for extrasolar planet detection, particularly terrestrial planets at a range of 15 parsec or less. 1 parsec may be derived from the smallest angle measurement of 1/3,600th of a degree.

In another example embodiment, system considered may include several modest-sized telescopes (light collectors), each equipped with photodetection apparatus and the means to record the photodetector signal time-history. At some convenient location, the cross-correlations of the individual light collector photodetection histories may be computed to yield, in turn, a collection of values for the magnitudes of the mutual coherence of the target scene at various measurement baselines. Further, computed coherence magnitudes may be used to infer the apparent motion of the target star.

In another example embodiment, provided sufficiently large measurement baselines, the resolution of the target star motion may be very fine. Signal-to-noise ratio (SNR) of a single coherence magnitude measurement may be computed. Further, using simple models of the telescope array and target extraterrestrial body gravitational perturbation, the SNR may be computed to determine the planet orbit parameters. Thus, the aforementioned technique may have several advantages compared to amplitude interferometry.

In another example embodiment, quantum photon entanglement may be used to increase the sensitivity of the interferometer measurement. The quantum entangled photon interferometer approach may apply to many types of interferometers. In particular, without non-local entanglement, a generic classical interferometer may have a statistical-sampling shot-noise limited sensitivity that scales like 1N, where N is the number of particles (e.g., photons, electrons, atoms, neutrons) passing through the interferometer per unit time. However, quantum correlations may improve the interferometer sensitivity between the particles by a factor of a square-root-of-N, to scale like 1/N. 1/N may be the limit imposed by the Heisenberg Uncertainty Principle. Further, optical interferometers may operate at a specified optical power, and the quantum sensitivity boost corresponds to an order-of-magnitude improvement of SNR.

In yet another example embodiment, beams collected at an aperture of a telescope may be converted to data. Further, the data may be transferred to a suitable location to calculate the mutual coherence. In one or more embodiments, the mutual coherence may be the phase relationship between photons collected at a pair of telescopes. Using the mutual coherence data, the desired image of the extraterrestrial body (e.g., 1014) and/or other image may be computed and used as a means for entry pupil processing. In one or more embodiments, entry pupil may represent the entry nodal point of a lens.

Although the present embodiments have been described with reference to specific example embodiments, it will be evident that various modifications and changes may be made to these embodiments without departing from the broader spirit and scope of the various embodiments. Also, for example, various devices such as data collecting telescopes may be placed on other moving bodies.

It is obvious that computing station 404 may be a computing system including a memory and a processor communicatively coupled to the memory (processor and memory not shown because of obviousness reasons). The processor may be configured to execute all instructions associated with the computation described with reference to FIG. 6.

In addition, it will be appreciated that the various operations, processes, and methods disclosed herein may be embodied in a machine-readable medium and/or a machine accessible medium compatible with a data processing system (e.g., a computer device), and may be performed in any order (e.g., including using means for achieving the various operations). Accordingly, the specification and drawings are to be regarded in an illustrative rather than a restrictive sense.

What is claimed is:

1. A method comprising:
   receiving, at a computational station, photodetection data, originating at a source, encompassing a set of frequency channels and collected at a plurality of light gathering telescopes;
   determining, through the computational station, correlation between the received photodetection data in each frequency channel;
   determining, through the computational station, a time average of the correlation between the received photodetection data in the each frequency channel;
   determining, through the computational station, an average over the set of frequency channels to arrive at a mutual coherence magnitude for each pair of the plurality of light gathering telescopes; and
   determining, through the computational station, imaging data of the source based on applying a phase retrieval technique that computes the imaging data from the determined mutual coherence magnitude and the correlation between the received photodetection data.

2. The method of claim 1, wherein the source is an extraterrestrial body.

3. The method of claim 1, further comprising utilizing entry pupil processing to obtain ultra-fine resolution imaging data of the source.

4. The method of claim 1, further comprising obtaining signal-to-noise characteristics of a mutual coherence for the each pair of the plurality of light gathering telescopes.

5. The method of claim 4, utilizing partial coherence to attenuate a parent star of an extrasolar planet.

6. The method of claim 1, wherein each of the plurality of light gathering telescopes is carried in a spacecraft.

7. An interferometer comprising:
a plurality of detectors configured to detect photodetection data originating at a source and encompassing a set of frequency channels;
a correlator to receive the detected photodetection data and to determine correlation between the received photodetection data in each frequency channel;
a recorder to record the determined correlation; and
a computational station to determine an average over the set of frequency channels to arrive at a mutual coherence magnitude for each pair of the plurality of detectors and to determine imaging data of the source based on applying a phase retrieval technique that computes the imaging data from the determined mutual coherence magnitude and the correlation between the received photodetection data.

8. The interferometer of claim 7, wherein each of the plurality of detectors includes an aerial associated therewith for the detection of a signal associated with the photodetection data.

9. The interferometer of claim 8, further comprising a low pass filter through which the signal detected through a detector is passed through.

10. The interferometer of claim 7,
wherein the source is an extraterrestrial body, and
wherein the interferometer is utilized to measure an angular diameter of the extraterrestrial body.

11. The interferometer of claim 7, wherein the interferometer is configured to work with a large baseline, the baseline being a projected separation between any two detectors of the plurality of detectors.

12. The interferometer of claim 7, wherein a detector is a cell whose electrical output varies with a variation in an incident light beam, the detector having a mirror associated therewith to reflect the incident light beam thereto.

13. The interferometer of claim 8, wherein the cell is one of: a photoelectric cell, a light detector and a phototube.

14. A planet imaging system comprising:
a plurality of spacecrafts, each of which includes a light gathering telescope to collect photodetection data encompassing a set of frequency channels from a source;
a plurality of canceling collectors placed appropriately to negate an effect of any light emitting body closer to the source than the plurality of spacecrafts;
a first pod combiner to collect the photodetection data from the plurality of spacecrafts;
a second pod combiner to collect the photodetection data from the plurality of canceling collectors;
an imaging combiner to collect data from both the first pod combiner and the second pod combiner; and
a computational station to receive data from the imaging combiner, to compute the correlation between the photodetection data in each frequency channel, to determine a time average of the correlation between the photodetection data in the each frequency channel, to determine an average over the set of frequency channels to arrive at a mutual coherence magnitude for each pair of the plurality of spacecrafts, and to determine imaging data of the source based on applying a phase retrieval technique that computes the imaging data from the determined mutual coherence magnitude and the correlation between the received photodetection data.

15. The planet imaging system of claim 14, wherein the source is an extraterrestrial body.

16. The planet imaging system of claim 14, further comprising a phasing beacon to negate a requirement to propagate beams collected at the plurality of spacecrafts and the plurality of canceling collectors to combining stations.

17. The planet imaging system of claim 14, wherein the light gathering telescope includes a photodetection apparatus associated therewith and means to record a time history of a photodetector signal.

18. The planet imaging system of claim 14, wherein the computed imaging data is further treated in accordance with entry pupil processing.

19. The planet imaging system of claim 14, wherein individual spacecrafts of the plurality of spacecrafts do not move in a single plane and are independent from one another.

20. The planet imaging system of claim 14, wherein individual spacecrafts of the plurality of space crafts and individual collectors of the plurality of canceling collectors are not in alignment and formation therebetween.

* * * * *